United States Patent

Vande Wege

[15] 3,646,275

[45] Feb. 29, 1972

[54] BUSY PERIOD MARKER SPEEDUP SYSTEM

[72] Inventor: John R. Vande Wege, Glen Ellyn, Ill.

[73] Assignee: Automatic Electric Laboratories, Inc., Northlake, Ill.

[22] Filed: Sept. 25, 1970

[21] Appl. No.: 75,585

[52] U.S. Cl. ....... 179/18 E

[51] Int. Cl. ....... H04q 3/48

[58] Field of Search ....... 179/18 E, 18 FH

*Primary Examiner*—Kathleen H. Claffy

*Assistant Examiner*—Thomas W. Brown

*Attorney*—Cyril A. Krenzer, K. Mullerheim, B. E. Franz and Glenn H. Antrim

[57] ABSTRACT

A telephone switching system matrix arrangement controlled by a marker to complete communication connections therethrough. That portion of the marker responsive to a call for service, is shown and a call for service test arrangement. This test circuit is effective to initiate the operation of other circuitry to accelerate the marker operation when a call for service is present at the time a marker is completing the servicing of a prior call by omitting certain operations thereof.

3 Claims, 4 Drawing Figures

INVENTOR
JOHN R. VANDE WEGE
BY Bernard E. Franz
ATTORNEY

BUSY PERIOD MARKER SPEEDUP SYSTEM

BACKGROUND OF THE INVENTION

1. Field of the Invention

This invention relates in general to cross-point type telephone switching systems and more particularly to an arrangement for decreasing the time required for controlling the cross-point operations in such a system.

2. Description of Prior Art

The preferred embodiment disclosed herein is for use in the switching network and marker described in U.S. Pat. No. 3,413,421, by A. S. Cochran et al. for Identifying Arrangement for Communication Switching System.

The building block circuits may be of the type described in U.S. Pat. No. 3,293,368, by W. R. Wedmore, with reference in particular to FIG. 51 of the drawing and columns 23, 24, 48 and 49 of the specification thereof.

The above-mentioned patents are owned by the same assignee as the present application and are incorporated herein and made a part hereof as though fully set forth.

Known systems of the prior art comprise a plurality of cascade stages of cross-point switching matrices having two sides designed as the input and the output sides. The basic equipment for controlling the interconnection of these two sides is known as the marker. It functions to respond to a call for service, identify the calling terminal and control the connection via the matrices to an available output terminal, which in a typical system would be the originating junctor and register. The marker operation may be performed by a single unit or a plurality of units depending upon system requirements and the amount of operations assigned to the marker during its connected interval. Among the functions that the marker may be required to perform are: the testing of the selected path for proper operation of the cross-points, the busy or idle condition of the called terminal, the ability of the cross-points to remain operated, and to provide a control and transmission path from the other common control equipment.

The assignment of functions and the number of markers that are provided in a particular switching system is controlled by the anticipated maximum number of calls that must be serviced during a particular period. This maximum rate of service however does not persist throughout the day and even varies during different days of the week. Obviously then, there are extended periods when the markers are little used.

SUMMARY OF THE INVENTION

Accordingly, it is an object of the present invention to provide a marker arrangement capable of providing a high rate of connection during high-usage periods, and of providing auxiliary operations for increasing system reliability during low-usage periods.

The marker includes facilities to determine the presence of a call for service signal waiting at the time of completion of the processing of a prior call, and to thereafter control its operations to omit the matrix testing operations and speed up certain other operations associated with each connection.

BRIEF DESCRIPTION OF THE DRAWINGS

The novel features which it is believed are characteristic of the invention, both as to its organization and method of operation, will be more apparent from the following detailed description taken in conjunction with the accompanying drawings comprising FIGS. 1–4 wherein.

DESCRIPTION OF THE PREFERRED EMBODIMENT

Figure 1:
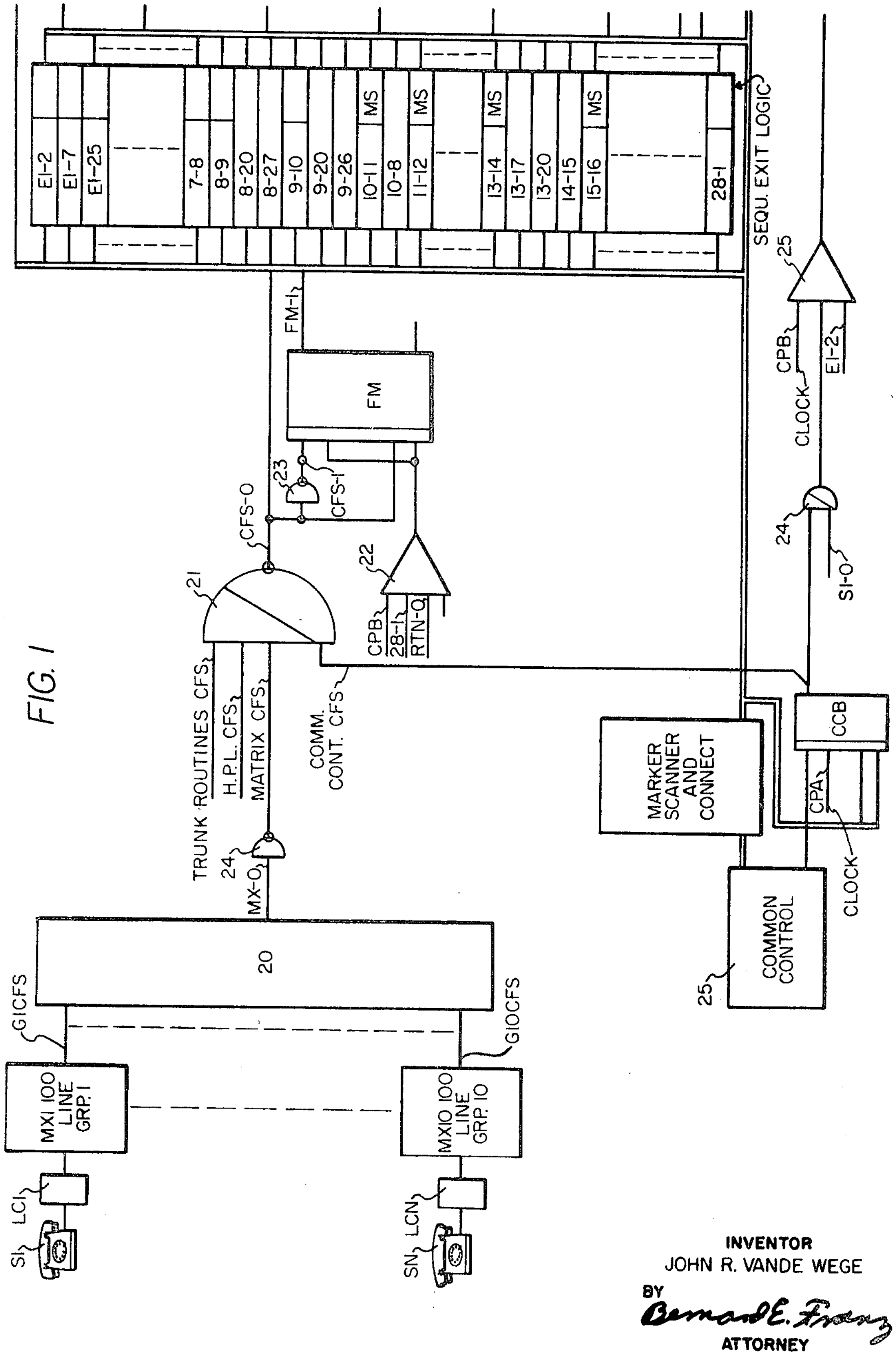
FIGS. 1 and 2 arranged with FIG. 1 alongside FIG. 2 comprise a schematic of the speedup circuitry of this invention as connected to the sequence state register of a switching system marker.

The invention is incorporated in the marker apparatus of the referenced U.S. Pat. No. 3,413,421, a portion of which is shown in FIG. 1.

The marker is arranged to perform its functions in a series of steps; these steps are arranged to optimally perform the operations required in completing a connection through the matrix with which the marker is associated. This sequence is fixed, but there are variables that may or may not require certain operations of the marker. These variables are accommodated by including additional operations during certain steps and by omitting or altering the sequence of steps or groups of steps in the overall sequence of operation. The general operation of the marker in processing a call follows.

The calling party S1 initiates a call by lifting the telephone handset off-hook which causes seizure of the line circuit LC1 associated with the calling party. The line circuit extends the call for service to the switch matrix MX1 and marker group. The marker, continuously scanning the matrix control leads, recognizes this call for service and determines the location of the calling party. By determining the location of the calling party is meant the inlet to the switch matrix the calling party's line circuit is connected to. This is a permanent relationship and when the marker has determined the line number identification, it is gated on to the data transmission path and sent to the common control. Under heavy traffic conditions the line scanning operation would be inhibited until the common control equipment has completed its allotted ratio of calls.

The common control scans the memory, and when it finds an idle register-sender, loads its equipment number location onto the data transmission path to be sent to the marker.

The marker now hunts for an idle path through the matrices from the line circuit at the A-stage to the idle register-sender at the C-stage.

When an idle path is found through the matrices, it is operated by the marker to connect the calling party to the register-sender. During a normal call process the marker checks the busy-idle status of the links to be used in the connection, checks the connection for continuity and ability to hold, indicates to the register-sender the mode of dialing the calling party will be using, and releases. When operating under high-traffic conditions the marker is arranged to eliminate these matrix link test operations. If the mode of dialing is DTMF (dual tone multifrequency), the register-sender calls in a DTMF receiver to assist in processing the call. Dial tone is now returned to the calling party, and the calling party begins to key-in (dial) the number of the desired party. Upon receipt of the necessary digits, the register-sender passes this information to the common control to determine the translation necessary for this call.

The common control calls the marker in a second time and indicates the outgoing trunk needed for this call. The marker now establishes a connection between the sender and the outgoing trunk in the same manner that it connected the calling party to the register. The translated digits are spilled forward to the called office, and the priority and class of call are stored in the outgoing trunk. Once the register-sender has completed its functions, the marker is called a third time and instructed to drop the connection from the calling party to the register, and from the sender to the outgoing trunk. The originating line and terminating trunk are held by the marker until the transmission path from the calling party to the outgoing trunk is established.

Figures 2, 4:
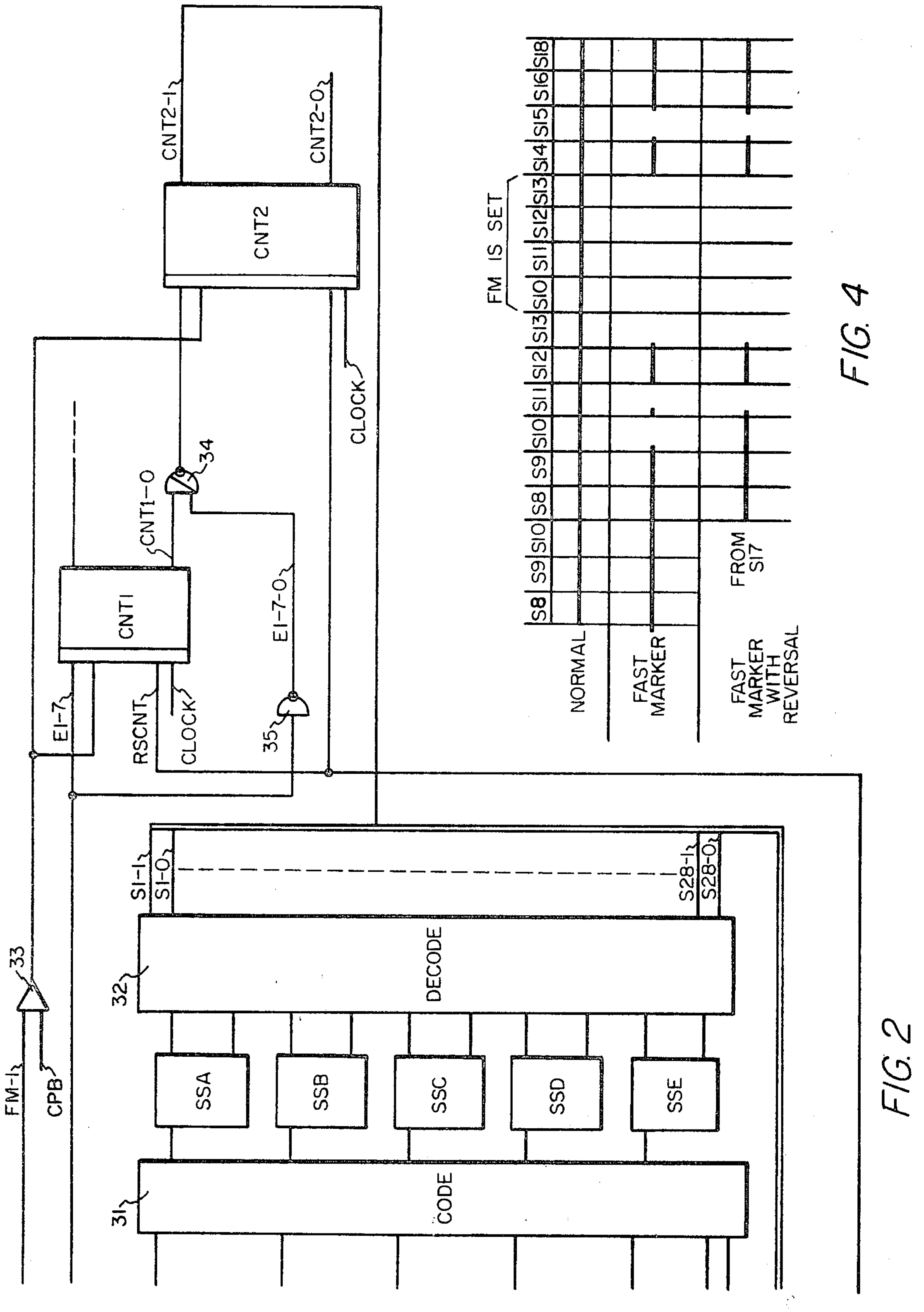
FIG. 4 is a chart showing the timing changes effected for a marker speedup.

FIGS. 1 and 2 show the portions of the sequence control of a marker relevant for a disclosure of the manner of accelerating the processing of a call by the marker. The matrices are normally arranged in groups of 100 lines each and are shown by the boxes labeled MX1 and MX10 with the broken line indicating the remaining units 2 through 9. Each group of lines is arranged to produce an individual call for service to an allotting logic arrangement within box 20. A signal lead MX–0 for indicating the presence of a call for service to the marker logic is connected after inversion at gate 24 to NOR-gate 21. This gate is arranged to produce an output in response to a call for service from any one of the units there connected, such as the trunk routiner, high-precedence line, matrix, or common control. The output of this gate, inverted at gate 23 is taken to the DC set input of a bistable register FM. Register FM will be set upon the simultaneous presence of a signal on its AC set input. This signal is conditioned upon the occurrence of a pulse CPB from the system clock, and the marker sequence control prepared to advance from sequence state 28 to sequence state 1, the idle state. Therefore FM will only be set when the marker is prepared to enter its idle state and there is another call waiting for service. The effect of FM being set is to cause acceleration of the sequence logic operations shown on FIG. 1 with an MS within the particular box and the elimination of sequence steps 10, 11, 12 and 13 a second time. The speeded up sequence is graphically shown by the chart of FIG. 4. The reset of register FM is effected upon the sequence exit logic progressing from sequence state 28 to state 1 and a clock pulse CPB and no call for service signal present at its DC reset inputs. The particular logic progression resulting from the setting of register FM is coded, registered and decoded into signals indicative of the sequence states by circuitry shown as boxes 31, registers SSA, SSB, SSC, SSD and SSE, and box 32 respectively.

To insure the complete processing of a call, and prevent the possibility of line calls for service swamping the marker, it is necessary that the marker service the common control approximately twice for each matrix call for service. This is accomplished by a two-stage counter CNT1 and CNT2 that is enabled whenever register FM is set. The FM set signal FM–1 and a clock pulse CPB are gated through amplifier 33 and the output is fed to the AC set inputs of register stages CNT1 and CNT2. The sequence logic progresses from state 1 to state 7, indicative of the processing of a common control call. The transition signal, E1–7, on the DC set input of the FM–1 counter register CNT1 along with the simultaneous presence of the clock pulse CPB on the AC set input causes CNT1 to become set and prepare CNT2 for setting. Register CNT2 is enabled from the reset output CNT1–0 of register CNT1 to NOR-gate 34 along with the sequence exit signal E1–7 (a second time) inverted at gate 35, and connected from the output of gate 34 to its DC set input. Register CNT2 is set from the simultaneous presence of clock pulse CPB and FM–1 on the AC set input and a true signal on its DC set input. The presence of a true signal at the output CNT2–1 is effective to disable that portion of the marker logic in box E1–7 (MS) to cause the marker to accept a matrix call for service. Conversely with a false signal on output CNT2–1 and register FM set the sequence logic is arranged to give precedence to common control calls for service.

The counter is reset every time that a matrix call for service is processed, as indicated by the E1–2 signal at gate 25 or the marker is in sequence state 1, the idle state, and no common control call for service is present. The common control call for service signal from the common control call for service signal buffer CCB set output is gated with the reset output S1–0 of the sequence decode logic at gate 24 to produce an enabling signal with the clock signal CPB at gate 25.

Figure 3:
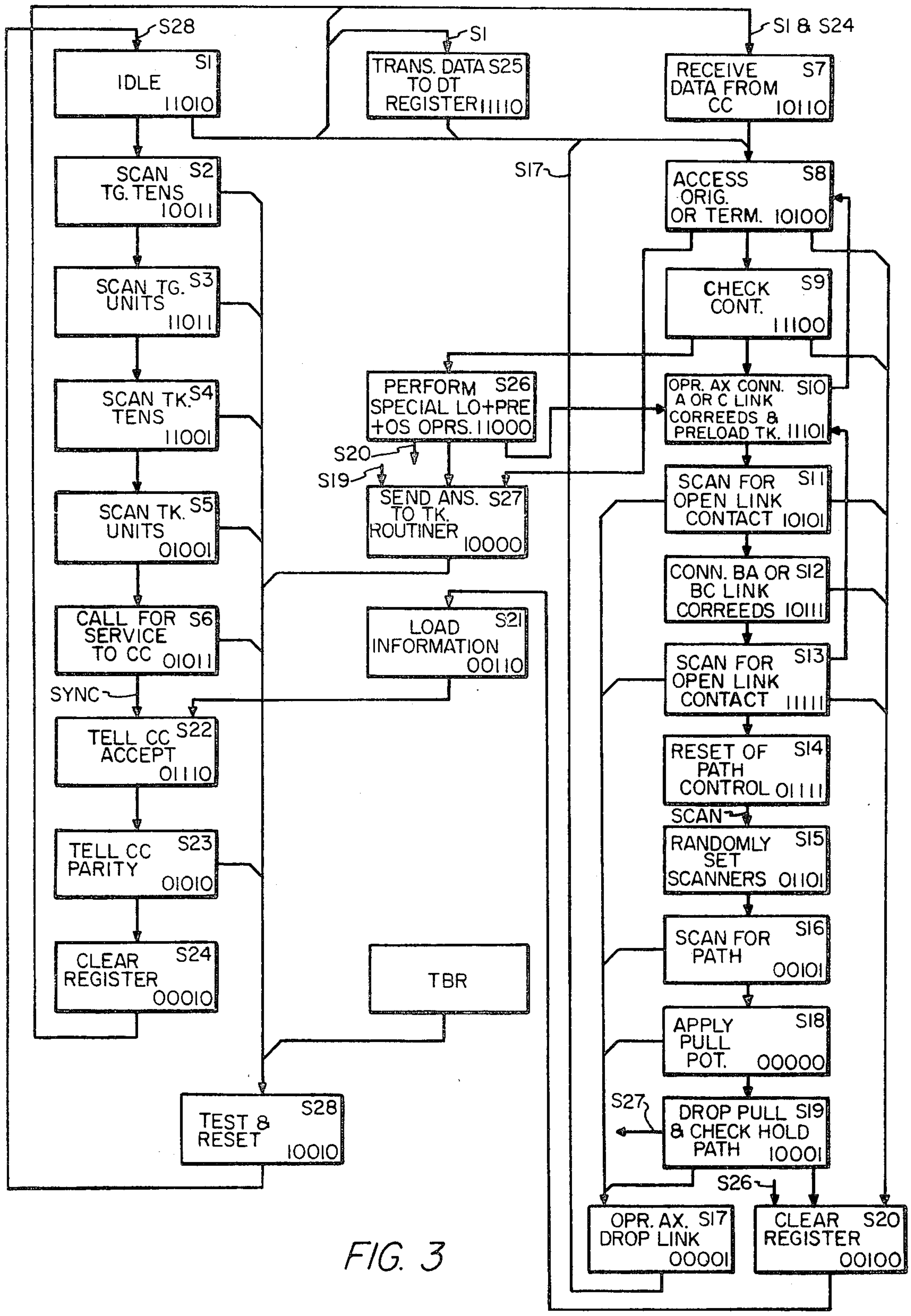
FIG. 3 is a sequence state chart of the operations of a switch marker.

A simplified sequence state flow chart of the originating marker is shown in FIG. 3. The operations required to be performed by the marker for satisfactorily completing its functions are briefly described, being initiated from sequence state 1. This is the state that the marker remains in while waiting for a call for service. Upon receipt of a call for service the marker will perform certain tests as to where the call originated, that is whether from a high-priority line, a normal call for service, a common control call for service or a routiner call for service. Then, dependent upon which of the preceding types the call for service is, the marker will advance to sequence state 2 for a high-priority call or a normal call, to sequence state 7 for a common control call for service or to sequence state 25 for a routiner call for service.

A high-priority line call for service will take precedence over every other call for service. Also, a normal call for service will take precedence over a common control call for service if the common control call counter is set (CNT2–1) indicating that the common control has accessed the matrix two times in succession.

The sequence advances to state 7 when there is a common control call for service and there is no matrix call for service or no set counter indication.

In sequence state 25, the marker receives the information for the operation required by the routiner. The marker will next enter sequence state 8 and proceed through the subsequent steps as for a matrix call for service until it reaches sequence state 19, where it will go to sequence state 27 instead of 20.

When the advance is to sequence state 2 the marker identifies the trunk-group 10's digit and proceeds to sequence state 3 where the trunk-group units digit is identified.

In states 4 and 5 the marker will identify the trunk 10's and units digits respectively, and proceed to sequence state 6. During any of the states 2 through 5 the marker will proceed to sequence state 28, should the call be abandoned. The marker has the identity of the line calling for service stored within itself, upon entering sequence state 6, and proceeds to call for the common control equipment. The marker advances to sequence state 22 if a common control register is available, otherwise it goes to sequence state 28.

During sequence state 22 the identity information is sent to the common control and checked for proper reception, after which the sequence is advanced to state 23.

In sequence state 23 the marker indicates to the common control equipment that the parity of the information sent was correct. Again, if the call should become abandoned at this stage, the marker will proceed to state 28, otherwise it goes to state 24.

In sequence state 24 the marker resets its data registers preparatory to receiving the matrix numbers from the common control. After the data registers have been reset the marker advances to state 7 during which the common control responds with various items of processing information. If the call had originated with the common control equipment, the marker would receive the special function data as well as that data normally received.

The program is next advanced to sequence state 8 where the marker operates relays of a tree to the terminating trunk and operates the selected unit. Normally the next sequence state is 9 during which the continuity of the control leads contacts is checked. Upon completion of these tests the marker advances to sequence state 10, however, if the call originated with the common control equipment and was for the purpose of locking out or preempting a trunk, the marker should go to sequence state 26. The marker would also go to sequence state 26 when the call is from a routiner.

In sequence state 26, if the instructions are for a lockout operation, this will be performed and the marker will proceed to sequence state 20 to inform the common control equipment of the successful completion of the operation; if the instructions are for a preempt operation, this is attempted, and if successful, the marker proceeds to sequence state 10, and if successful the marker enters sequence states 20 and 21 to inform the common control equipment of this ability. Where the call is from the routiner, as for example to place a trunk out of service, this operation is performed and the marker enters sequence state 27. In sequence state 27 the marker returns information to the routiner relative to the operation performed and proceeds to sequence state 28.

In sequence state 10 various items of information are loaded into the trunk circuit and the tree to the terminating trunk is dropped, after which the marker returns to sequence state 8.

During the second time in sequence state 8 the marker operates relays of a tree to the originating trunk and proceeds through states 9 and 10 in the same manner as described above. This time upon leaving state 10 the marker is advanced to state 11.

In sequence state 11 the path scanner is started and the contact continuity at the tree connecting the A-links to the scanner is checked. The normal exit is to state 12, however, if the contacts are open the exit is to sequence state 17.

In sequence state 12 the BA link tree is set up and the marker advances to sequence state 13.

In sequence state 13 the marker scans for open contacts in the BA link tree and then since the path is not complete the marker is returned to sequence state 10. Upon entering sequence state 10 for the third time the marker sets up and tests the tree to the links on the C-side of the matrix preparatory to scanning them and proceeds to state 11.

In sequence state 12 the second time the marker connects the BC–BB links to the scanner, then enters sequence 13.

During the second time in sequence state 13 the link trees are checked for an open circuit condition after which sequence state 14 is entered.

In sequence state 14 the path control equipment is reset and the marker is advanced.

In sequence state 15 the path scanner is set to a random starting position except when FM is set, then this state is entered and immediately left.

And in sequence state 16 the scanner is operated to select a path. If a path is found the marker proceeds to sequence state 18, if not then to sequence state 17.

In sequence state 17 the marker reverses the A- and C-appearances of the originating and terminating trunks and then proceeds through sequence states 8, 9, 10, 11, 12, 13, 14, 15 and 16. After passing through sequence state 16 the marker advances to sequence state 18.

In sequence state 18 the marker applied the pull potentials to operate the cross-points of its selected path and proceeds to sequence state 19.

In sequence state 19 the selected path is checked for continuity and if successfully completed proceeds to sequence state 20.

In sequence state 20 the data transfer registers of the marker are reset and the marker proceeds to state 21.

In sequence state 21, information about the call is prepared for sending to the common control equipment and the marker enters state 22.

In sequence state 22 the information is transferred to the common control, and the marker enters state 23.

During state 23 the marker performs the parity test on the data, and if correct enters state 28.

In sequence state 28 the marker performs a series of tests to insure a successful resetting of the marker, after which the marker returns to sequence state 1.

Each of the sequence states of the marker is recorded during its existence by the sequence state register consisting of the five bistable devices SSA through SSE. This register is operated to advance its count by the wired logic shown by block 11 which is connected to the associated elements of the marker, and to the register decode logic shown by block 12.

During periods of heavy traffic when FM is set, the tests applied to the link tree contacts are temporarily bypassed with no adverse effects. The connection of the C and BC links to the scanners is accomplished during the first pass through S10, S11, S12 and S13 making the second pass unnecessary. This resulted in an approximately 20 percent saving in cycle time when traffic is heavy while retaining fault checking on an automatic, regular, and frequent basis.

What is claimed is:

1. The invention having a switching network, a central processor means, a plurality of line circuits each having means to call for service connected to said network, and a marker for controlling the establishment of connections via said network, means in said marker operated to respond to a call for service when in an idle state to select one of said lines, first cycle control means operated upon selection of a calling line circuit to execute a normal call processing cycle for said selected lines, the improvement comprising; test means in said marker effective at the end of a call processing cycle to check for the presence of another call for service, fast cycle control means operated upon said test means finding a call for service, and a second cycle control means operated responsive to said fast cycle control means operation to execute a call processing cycle omitting certain operations.

2. The invention as claimed in claim 1 wherein said system operation necessitates the placing of more than one call through said network from said central processor for each line call through said network and further including; a counter operated after operation of said fast cycle control means to count each call for service from said central processor, and inhibit means including said counter to prevent said means in said marker responding to a call for service from one of said lines.

3. The invention as claimed in claim 2 further including enabling means operated upon said counter registering two calls for service from said central processor to enable said means in said marker to respond to calls for service from said lines.

* * * * *